Oct. 1, 1957 J. R. KLEIN Re. 24,365

COMBINED HEATING AND SOLDERING DEVICE

Original Filed June 23, 1954

Inventor
Joseph R. Klein
By Drahillon Jones
Attorneys

United States Patent Office

Re. 24,365
Reissued Oct. 1, 1957

24,365

COMBINED HEATING AND SOLDERING DEVICE

Joseph R. Klein, Pewaukee, Wis.

Original No. 2,745,368, dated May 15, 1956, Serial No. 438,773, June 23, 1954. Application for reissue May 1, 1957, Serial No. 657,469

4 Claims. (Cl. 113—110)

Matter enclosed in heavy brackets [ ] appears in the original patent but forms no part of this reissue specification; matter printed in italics indicates the additions made by reissue.

This invention relates to the securement of pipe fittings to pipes and refers more particularly to the sweating of joints between copper tubing or pipe and fittings to be connected thereto. The conventional manner of effecting such connections is to heat the interfitting portions of the fitting and pipe with a blow torch and then, when the metal has reached a temperature in the neighborhood of 350° F., to apply a drop of solder to the mouth of the joint. If the temperature of the parts is correct, the solder flows rapidly into the joint and a secure sweated connection is obtained, but if the temperature is not right, the joint is apt to leak.

Obviously, to make a sweated joint in this conventional manner requires considerable expertness, and because of the time involved, is high in labor cost. Moreover, the use of a blow torch creates a fire hazard.

With these objections to the prior practice in mind the present invention has as its purpose the provision of a simple device which not only greatly reduces the time required to make a sweated joint, but in addition, assures that every joint will be perfect. To this end, it is more specifically an object of the present invention to provide a combined heating and soldering device which has a self-contained combustible heating element and just the right amount of solder so positioned as to be held at the mouth of the joint when the device is in position of use and to flow into the joint when the interfitting portions thereof are heated by the combustion of the heating element.

With the above and other objects in view, which will appear as the description proceeds, this invention resides in the novel construction, combination and arrangement of parts substantially as hereinafter described and more particularly defined by the appended claims, it being understood that such changes in the precise embodiment of the herein-disclosed invention may be made as come within the scope of the claims.

The accompanying drawing illustrates two complete examples of the physical embodiment of the invention constructed according to the best modes so far devised for the practical application of the principles thereof, and in which.

Figure 1:
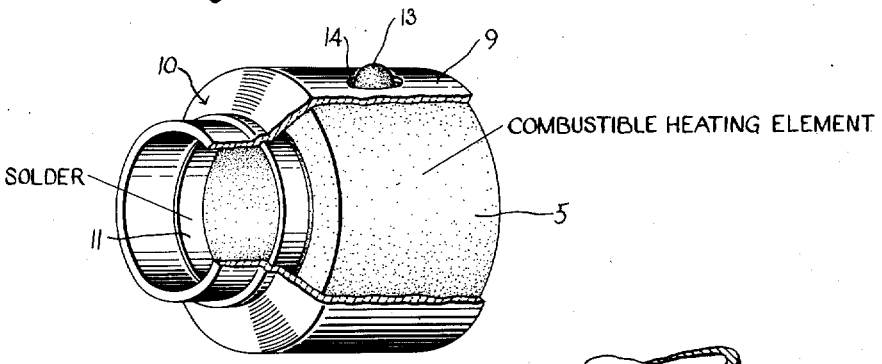
Figure 1 is a perspective view of a combined heating and soldering device embodying this invention, a part thereof being broken away to show structural detail.

Referring now more particularly to the accompanying drawing, the numeral 5 designates an annular heating element *or member* composed of a combustible exothermic substance. [The] *This annular member or* element is of a size to be readily slipped onto the end portion 6 of a fitting 7 *either* before the fitting is applied to the end of the pipe or tube 8 to which it is to be secured [.], *or thereafter, providing that the heating element or member had been previously slipped onto the pipe or tube.* Thus positioned, the heat generated upon combustion of the exothermic heating element heats the interfitting *or telescoped* portions of the pipe and fitting, and as will be readily understood the material of which the heating element is composed should burn with an intensity to generate sufficient heat to heat the interfitting portions of the pipe and fitting to the temperature needed to produce a good sweated joint.

The *annular* heating *member or* element 5 is fastened to the inside of a sleeve 9 near one end of the sleeve. Medially of its ends this sleeve is reduced in diameter to define a shoulder 10 and suitably fixed to the inside of the small diameter end portion of the sleeve and directly adjacent to the shoulder 10 is a curved length of solder 11 in wire form. The securement of the heating element and the solder to the sleeve 9 may be effected in any suitable way, as for instance by being glued thereto. The important thing is that the sleeve holds the solder and the heating element in a definite fixed relationship which assures proper placement of both on the interfitting portions of the pipe and fitting when the device is in position thereon; and since it is the heating element which is seated upon the fitting, the solder is in a sense supported from the heating element by the sleeve.

Figure 2:
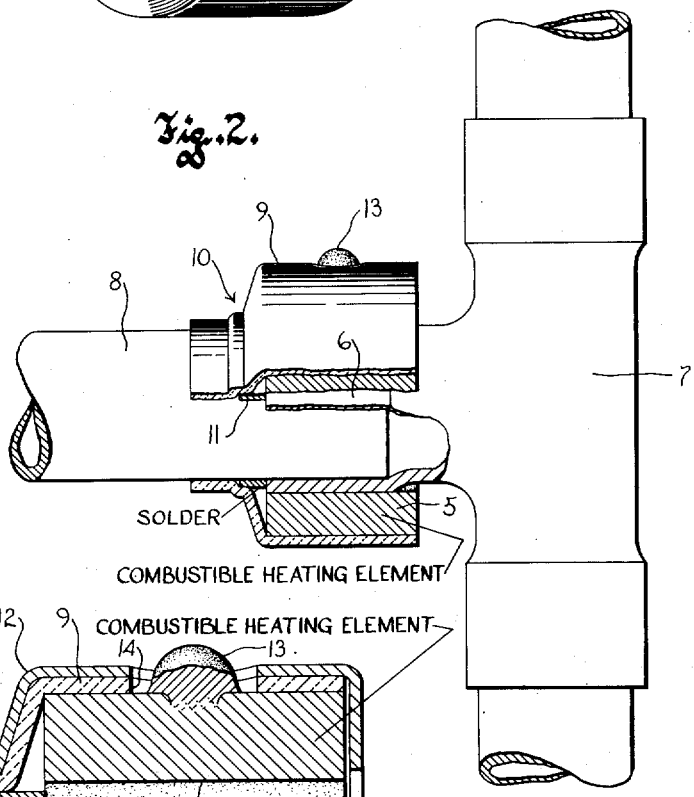
Figure 2 is a view in side elevation illustrating a pipe and fitting connected thereto and with the device of this invention in place on the assembled pipe and fitting, parts being broken away and shown in section.

[With the device in position on the assembled fitting and pipe] *The most convenient way of assembling the device with the pipe and fitting preparatory to making a joint is to simply slip the device onto the end of the pipe, insert the pipe into the fitting and then slide the device towards the fitting until the solder ring abuts the end of the fitting,* as shown in Figure 2. [with the] *This places the annular* heating element [5 seated on] *or member upon the portion of* the fitting *into which the pipe is telescoped* and *locates* the solder 11 [confined between the shoulder 10 and the end of the fitting, the solder is] in juxtaposition to the mouth of the joint between the fitting and pipe. Hence, as the interfitting portions of the pipe and fitting are heated to the proper temperature by the combustion of the exothermic heating element, the solder melts and flows into the joint.

Though the solder 11 has been illustrated as a complete loop of relatively thin flat wire it will be readily apparent that the only essential consideration is that the total amount of solder carried by the sleeve be correct, or at least sufficient, for the joint to be made [.], *and that it be properly positioned with respect to the heating element.* The specific form in which this amount of solder is supplied is not important, thus if a heavier wire solder were used an arcuate length thereof would be substituted for the complete loop shown and of course the amount of solder needed depends upon the pipe size for which the device is designed.

Figure 3:
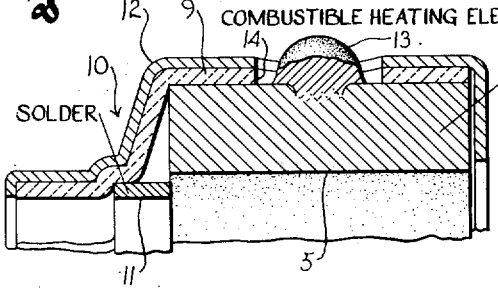
Figure 3 is a longitudinal sectional view through a slightly modified embodiment of this invention.

The sleeve 9 may be made of any suitable material. Thus, for instance, it may be made of sheet asbestos, or stiff paper or cardboard used alone as shown in Figure 1 or arranged within a metal sheath 12 as shown in Figure 3. Such a metal sheath has the advantage of preventing sparks being thrown out during the combustion of the heating element and igniting adjacent combustible material.

To facilitate the ignition of the heating element it may be equipped with a wick which could project from the end of the sleeve or through an opening therein, and if desired the wick can be in the form of a small protuberance 13 formed on the side of the heating element 5 and projecting through a hole 14 in the sleeve.

It will be readily apparent to those skilled in the art that the heating element 5 may be composed of many different exothermic compounds and still achieve the purposes of the invention. One mixture found by actual test to be satisfactory consists of the following:

| | Percent |
|---|---|
| Aluminum powder | 12.75 |
| Iron oxide ($Fe_2O_3$) | 28.65 |
| Potassium perchlorate ($KClO_4$) | 4.46 |
| Starch | 6.38 |
| Water | 47.78 |

This mixture forms a thick paste which may be readily formed or molded into an annulus of the desired dimensions and then dried. For a one-half inch nominal pipe size an annular heating element of the described composition and weighing between fifteen (15) and sixteen (16) grams generated sufficient heat, upon combustion, to produce a good sweated joint.

From the foregoing description taken in connection with the accompanying drawing, it will be readily apparent that this invention provides an inexpensive, reliable means for making sweated joints between copper pipe fittings and copper tubing or pipe, and that the invention possesses many advantages over the practice heretofore employed in the making of such connections.

What is claimed as my invention is:

1. A combined heating and soldering device for use in sweating fittings to pipes comprising: a sleeve having a small diameter bore opening to one end thereof and a large diameter bore opening to the other end thereof; a shoulder inside the sleeve joining said large and small diameter bores; a ring of solder secured within the small diameter bore of the sleeve adjacent to said shoulder, the inside diameter of the ring of solder and of the small bore being slightly larger than the outside diameter of a pipe of the size for which the device is designed; and a cylindrical heating element of exothermic material secured in the large diameter bore of the sleeve, the inside diameter of said heating element being larger than that of the ring of solder and the smaller bore by an amount substantially equal to the difference in outside diameters of the pipe and the fitting to be sweated to the pipe, so that in use, the heating element snugly fits around the portion of the fitting into which the pipe is telescoped when the ring of solder surrounding the pipe is brought to bear against the end of the fitting.

2. A combined heating and soldering device for use in sweating fittings to pipes comprising: a cylindrical heating element composed of exothermic material having an inside diameter of a size to snugly receive the portion of the fitting into which the pipe is telescoped; a ring of solder having an inside diameter smaller than that of the heating element by an amount substantially equal to the difference in outside diameters of the pipe and the portion of the fitting into which the pipe telescopes; and sleeve means connected to the outer portions of the heating element and the ring of solder to hold them coaxially aligned with one another with the ring of solder directly adjacent to one end of the heating element to bear against the end of a fitting onto which the heating element is telescoped.

3. The combined heating and soldering device of claim 2 further characterized by the fact that said means for connecting the heating element and ring of solder comprises: a sleeve encircling the heating element and the ring of solder to confine the heat and products of combustion resulting from combustion of the exothermic heating element.

*4. A collar-like combination heating and soldering device for use in sweating fittings to pipes comprising: an annular member of exothermic material having a bore of a size to fit snugly over the portion of the fitting into which the pipe is telescoped; a ring of solder having an inside diameter smaller than that of said annular member by an amount substantially equal to the difference in outside diameters of the pipe and the portion of the fitting into which the pipe is telescoped; and means holding the solder ring and the annular member in coaxial alignment with the solder ring in close proximity to one end of the annular member so that the solder ring forms an internal abutment engageable against the end of the fitting to properly position the device on the telescoped pipe and fitting with the solder ring contiguous to the mouth of the joint therebetween and the annular member surrounding the portion of the fitting into which the pipe is telescoped, said holding means comprising an annular part carried by and projecting axially from the annular exothermic member and supportingly engaging the solder ring only at portions thereof lying radially outward of the inside of the ring so as not to interfere with application of the device onto the telescoped pipe and fitting.*

References Cited in the file of this patent or the original patent

UNITED STATES PATENTS

| | | |
|---|---|---|
| 934,711 | Chapman | Sept. 21, 1909 |
| 1,662,945 | Wielage | Mar. 20, 1928 |
| 1,923,073 | Brell | Aug. 22, 1933 |
| 2,377,322 | Burrell | June 5, 1945 |
| 2,569,956 | Schiltknecht | Oct. 2, 1951 |
| 2,667,865 | Herman | Feb. 2, 1954 |
| 2,684,043 | Hughes | July 20, 1954 |